(12) United States Patent
Deferme (10) Patent No.: US 11,441,633 B2
(45) Date of Patent: Sep. 13, 2022

(54) DAMPER ASSEMBLY INCLUDING INTAKE VALVE IN FLUID CHAMBER

(71) Applicant: DRiV Automotive Inc., Lake Forest, IL (US)

(72) Inventor: Stefan Deferme, Heusden-Zolder (BE)

(73) Assignee: DRiV Automotive Inc., Skokie, IL (US)

(*) Notice: Subject to any disclaimer, the term of this patent is extended or adjusted under 35 U.S.C. 154(b) by 97 days.

(21) Appl. No.: 16/994,129

(22) Filed: Aug. 14, 2020

(65) Prior Publication Data
US 2022/0049755 A1    Feb. 17, 2022

(51) Int. Cl.
*F16F 9/34* (2006.01)
*F16F 9/516* (2006.01)
(Continued)

(52) U.S. Cl.
CPC ............ *F16F 9/5165* (2013.01); *F16F 9/185* (2013.01); *F16F 9/3271* (2013.01); *F16F 9/346* (2013.01); *F16F 9/348* (2013.01); *F16F 9/3488* (2013.01); *F16F 9/369* (2013.01); *B60G 13/08* (2013.01); *B60G 17/08* (2013.01); *B60G 2202/24* (2013.01); *B60G 2206/41* (2013.01);
(Continued)

(58) Field of Classification Search
CPC .. F16F 9/062; F16F 9/065; F16F 9/185; F16F 2222/12; F16F 2226/048; F16F 2228/066; B60G 13/008; B60G 13/08; B60G 17/0152; B60G 17/08; B60G 2202/24; B60G 2206/41; B60G 2206/8201; B60G 2500/10; B60G 2500/11; B60G 2800/162
See application file for complete search history.

(56) References Cited

U.S. PATENT DOCUMENTS

| 4,743,000 A | * | 5/1988 | Karnopp | ............ B60G 17/0152 |
| | | | | 188/266.5 |
| 4,802,561 A | * | 2/1989 | Knecht | .................... F16F 9/465 |
| | | | | 188/266.6 |

(Continued)

FOREIGN PATENT DOCUMENTS

| DE | 4041829 C2 | 11/1995 |
| DE | 19841857 A1 | 6/1999 |

(Continued)

*Primary Examiner* — Robert A. Siconolfi
*Assistant Examiner* — James K Hsiao
(74) *Attorney, Agent, or Firm* — DRiV Automotive Inc.

(57) ABSTRACT

A damper assembly includes an outer tube and an inner tube disposed in the outer tube defining a fluid space therebetween. The inner tube defines an inner volume. A piston is slidably disposed in the inner tube and divides the inner volume into a rebound working chamber and a compression working chamber. An active rebound valve is fluidly connected to the rebound working chamber and the fluid chamber, and an active compression valve is fluidly connected to the reserve chamber and the compression working chamber. An intake assembly is positioned in the fluid chamber to control the fluid flow through the active rebound valve and into the compression working chamber during a rebound stroke and to control fluid flow from the compression working chamber through the active compression valve and into the rebound working chamber during a compression stroke.

16 Claims, 7 Drawing Sheets

(51) Int. Cl.
  *B60G 13/08* (2006.01)
  *F16F 9/348* (2006.01)
  *F16F 9/36* (2006.01)
  *F16F 9/346* (2006.01)
  *F16F 9/32* (2006.01)
  *F16F 9/18* (2006.01)
  *F16F 9/06* (2006.01)
  *B60G 17/08* (2006.01)

(52) U.S. Cl.
  CPC .. *B60G 2206/8201* (2013.01); *B60G 2500/11* (2013.01); *B60G 2800/162* (2013.01); *F16F 9/065* (2013.01); *F16F 2222/12* (2013.01); *F16F 2226/048* (2013.01); *F16F 2228/066* (2013.01)

(56) References Cited

U.S. PATENT DOCUMENTS

| | | | | | |
|---|---|---|---|---|---|
| 5,178,240 | A * | 1/1993 | Houghton | | F16F 9/003 |
| | | | | | 137/513.7 |
| 5,195,619 | A * | 3/1993 | Dourson | | F16F 9/003 |
| | | | | | 188/266.3 |
| 5,335,757 | A * | 8/1994 | Knecht | | F16F 9/325 |
| | | | | | 188/266.6 |
| 5,375,683 | A * | 12/1994 | Huang | | F16F 9/096 |
| | | | | | 188/266.6 |
| 5,431,259 | A * | 7/1995 | Mizutani | | F16F 9/325 |
| | | | | | 188/266.4 |
| 5,586,627 | A * | 12/1996 | Nezu | | B60G 17/08 |
| | | | | | 188/266.6 |
| 5,588,510 | A * | 12/1996 | Wilke | | F16F 9/064 |
| | | | | | 188/266.6 |
| 5,603,392 | A * | 2/1997 | Beck | | F16F 9/325 |
| | | | | | 188/266.6 |
| 5,649,611 | A * | 7/1997 | Nakadate | | B60G 17/08 |
| | | | | | 188/266.6 |
| 5,788,030 | A * | 8/1998 | Rottenberger | | F16F 9/34 |
| | | | | | 188/290 |
| 5,901,820 | A * | 5/1999 | Kashiwagi | | F16F 9/46 |
| | | | | | 188/266.6 |
| 5,934,421 | A * | 8/1999 | Nakadate | | F16F 9/348 |
| | | | | | 188/299.1 |
| 5,934,422 | A * | 8/1999 | Steed | | F16F 9/46 |
| | | | | | 188/318 |
| 6,129,368 | A * | 10/2000 | Ishikawa | | B60G 17/0162 |
| | | | | | 280/124.112 |
| 6,283,259 | B1 * | 9/2001 | Nakadate | | F16F 9/369 |
| | | | | | 188/322.2 |
| 6,321,888 | B1 * | 11/2001 | Reybrouck | | F16F 9/325 |
| | | | | | 188/299.1 |
| 6,427,986 | B1 * | 8/2002 | Sakai | | B60G 15/14 |
| | | | | | 188/266.6 |
| 6,527,093 | B2 * | 3/2003 | Oliver | | F16F 9/464 |
| | | | | | 188/315 |
| 6,793,048 | B1 * | 9/2004 | Groves | | F16F 9/06 |
| | | | | | 188/266.6 |
| 6,978,871 | B2 * | 12/2005 | Holiviers | | F16F 9/325 |
| | | | | | 188/266.6 |
| 7,017,719 | B2 * | 3/2006 | Forster | | F16F 9/062 |
| | | | | | 188/314 |
| 7,438,164 | B2 * | 10/2008 | Groves | | F16F 9/464 |
| | | | | | 188/281 |
| 7,562,750 | B2 * | 7/2009 | Lemmens | | B60G 17/08 |
| | | | | | 188/266.1 |
| 7,950,506 | B2 * | 5/2011 | Nowaczyk | | F16F 9/466 |
| | | | | | 188/266.6 |
| 8,511,447 | B2 * | 8/2013 | Nowaczyk | | F16F 9/325 |
| | | | | | 188/315 |
| 9,062,737 | B2 * | 6/2015 | Hoult | | F16F 9/26 |
| 9,080,631 | B2 * | 7/2015 | Hoult | | B60G 21/06 |
| 9,347,511 | B2 * | 5/2016 | Kim | | F16F 9/461 |
| 10,041,560 | B2 | 8/2018 | Ankney | | |
| 10,473,179 | B2 * | 11/2019 | Ripa | | F16F 9/3488 |
| 10,570,982 | B2 * | 2/2020 | Zhu | | F16F 9/3257 |
| 2005/0121268 | A1 * | 6/2005 | Groves | | F16F 9/464 |
| | | | | | 188/266.6 |
| 2007/0000743 | A1 * | 1/2007 | Naitou | | B60G 15/12 |
| | | | | | 188/322.2 |
| 2013/0081913 | A1 * | 4/2013 | Nowaczyk | | B23K 11/14 |
| | | | | | 188/315 |
| 2015/0047937 | A1 * | 2/2015 | Kim | | F16F 9/461 |
| | | | | | 188/322.13 |
| 2015/0191069 | A1 * | 7/2015 | Zuleger | | F16F 9/465 |
| | | | | | 280/124.16 |
| 2016/0214453 | A1 * | 7/2016 | Tanahashi | | B60R 16/06 |
| 2017/0284497 | A1 * | 10/2017 | Uotani | | F16F 9/3257 |
| 2018/0135720 | A1 * | 5/2018 | De Kock | | F16F 9/3235 |
| 2019/0309816 | A1 * | 10/2019 | Shibata | | F16F 9/32 |
| 2020/0124129 | A1 * | 4/2020 | Mohammadi | | B21D 53/88 |
| 2020/0208704 | A1 * | 7/2020 | Deferme | | F16F 9/46 |
| 2021/0003190 | A1 * | 1/2021 | Deferme | | F16F 9/3405 |
| 2021/0348591 | A1 * | 11/2021 | Mathis | | F16F 15/023 |

FOREIGN PATENT DOCUMENTS

| | | |
|---|---|---|
| DE | 102010045076 B3 | 1/2012 |
| EP | 1862337 B1 | 8/2012 |
| KR | 101756423 B1 | 7/2017 |

\* cited by examiner

DAMPER ASSEMBLY INCLUDING INTAKE VALVE IN FLUID CHAMBER

FIELD

The present disclosure generally relates to dampers. More particularly, the present disclosure relates to a damper with external active control valves and a passive intake valve that selectively allows flow between a rebound working chamber and a compression working chamber.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression working chambers within the damper to counteract vibrations. By adjusting the flow of damping fluid between the chambers, greater or lower damping forces may be generated.

DETAILED DESCRIPTION

Figure 1:
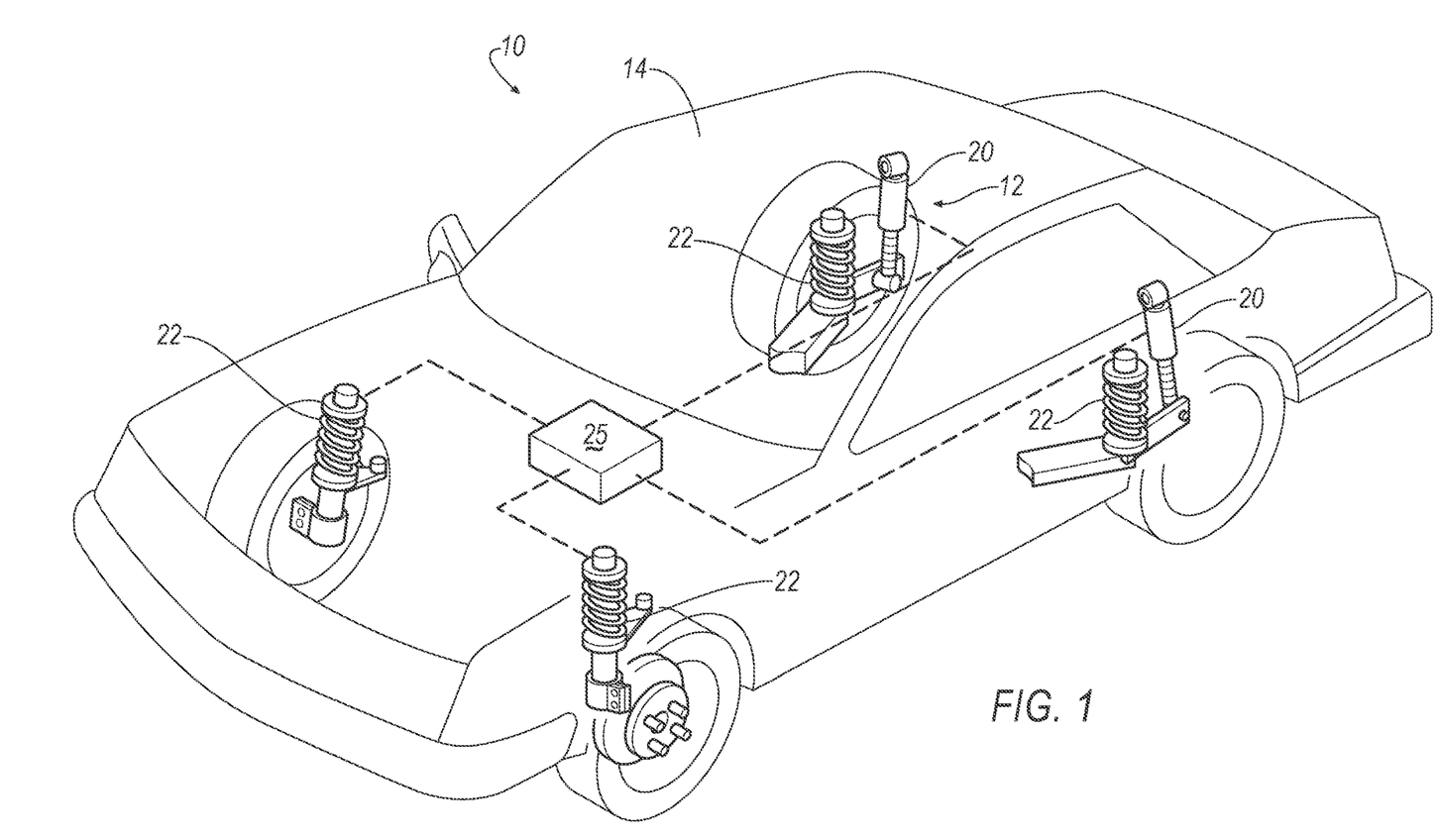
FIG. 1 is a schematic illustration of a vehicle including a suspension system having a plurality of damper assemblies.

The present disclosure relates to a damping system that continuously adjusts damping levels according to road conditions and vehicle dynamics. With reference to FIG. 1 there is shown a vehicle 10 having a suspension system 12 and a body 14. The suspension system 12 includes dampers 20 and coil springs 22. The dampers 20 are semi-active with damping levels controlled by an Electronic Control Unit (ECU) 25. ECU 25 receives information (acceleration, displacement, steering, breaking, speed) from sensors (not shown) at various locations on the vehicle to make independent adjustments to each damper.

Figure 2:
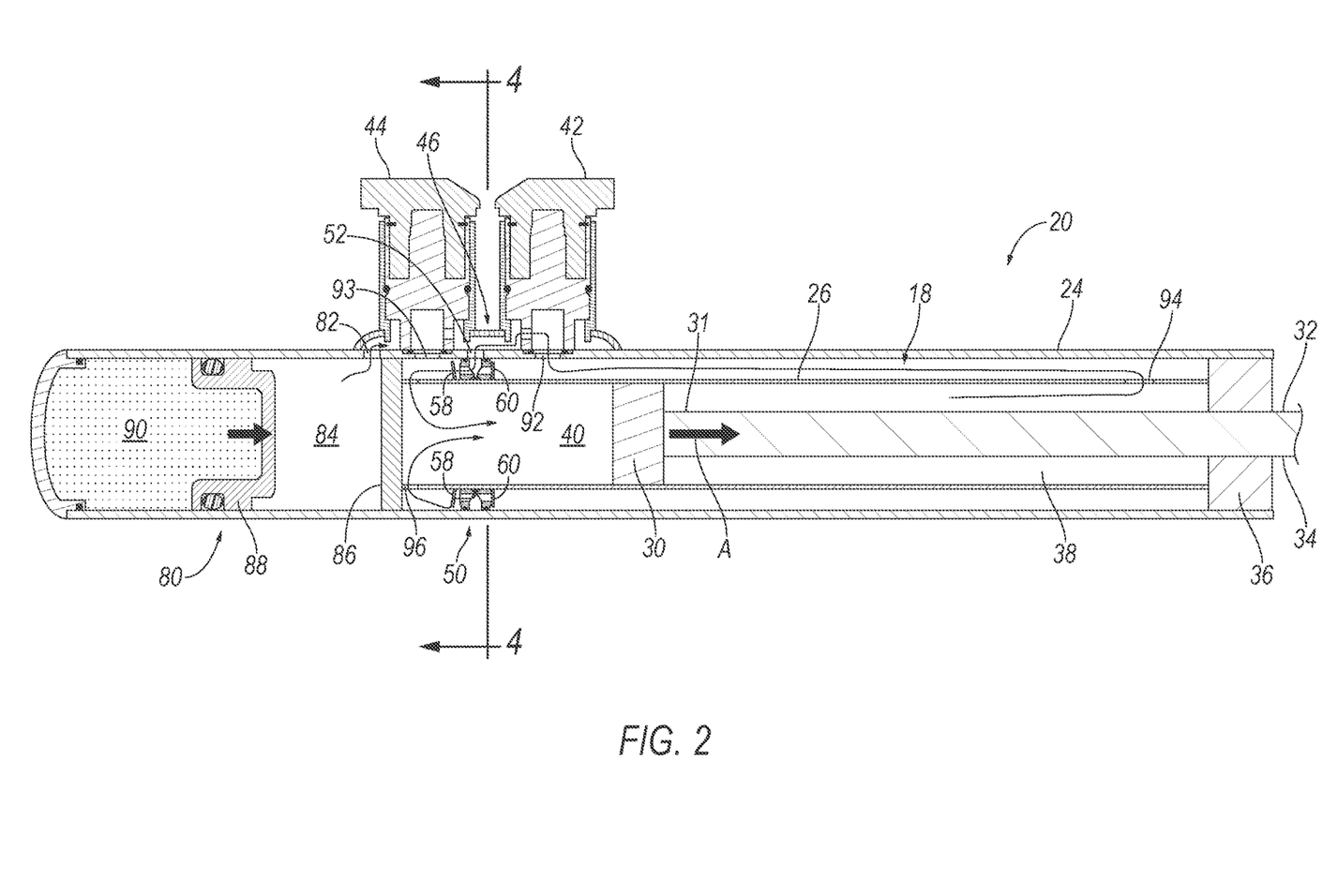
FIG. 2 is a cross-sectional view of a damper assembly in a rebound stroke.
Figure 3:
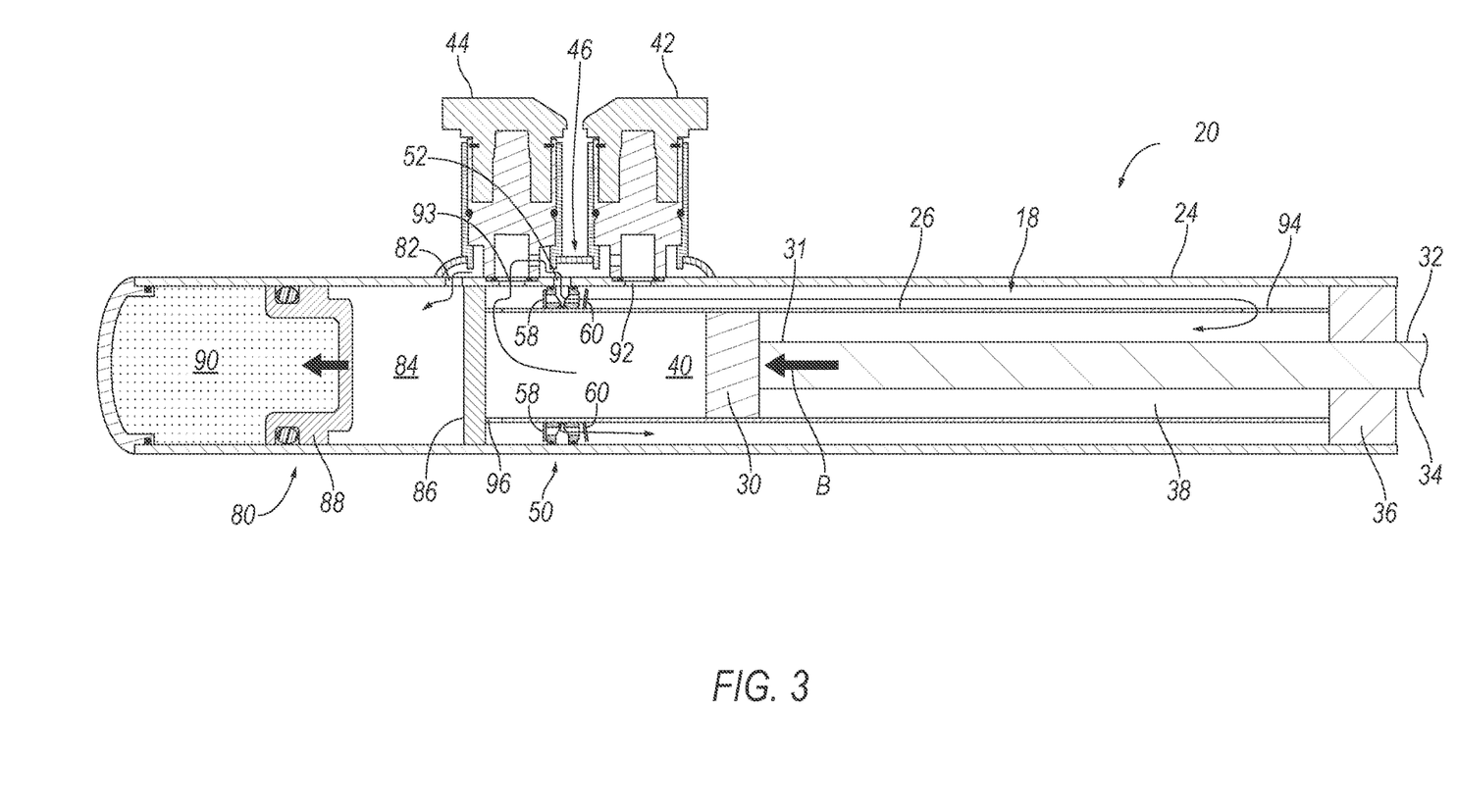
FIG. 3 is a cross-sectional view of the damper assembly in a compression stroke.

With reference to FIGS. 2 and 3 the exemplary disclosure provides a continuously variable damper 20 that includes an elongate outer tube 24 having a first end and a second end. The outer tube 24 has an inner tube 26 concentrically contained therein. A rod 32 including a piston 30 at a first rod end 31 is contained within the inner tube 26. The rod 32 includes a second end 34 extending externally of the outer tube 24 through a rod guide assembly 36. As shown the piston 30 and the inner tube 26 define a rebound working chamber 38 and compression working chamber 40. The rebound working chamber 38 and the compression working chamber 40 contain a fluid, preferably a hydraulic oil suitable for use with dampers.

The damper 20 includes an active rebound valve 42 in fluid communication with the rebound working chamber 38 through a fluid chamber 18 and a distal inner tube orifice 94. The active rebound valve 42 has a variable flow resistance controllable by the ECU 25. The damper 20 also includes an active compression valve 44 that is in fluid communication with compression working chamber 40 through a proximate inner tube orifice 96. The active compression valve 44 has a variable flow resistance controllable by the ECU 25. The active rebound valve 42 and active compression valve 44 are positioned external to the outer tube 24 as shown and are separated by a gap 46. An intake assembly 50 is provided within the fluid chamber 18 and may be positioned at the gap 46. The intake assembly 50 is in selective fluid communication with active rebound valve 42 and active compression valve 44 through an outer tube intake orifice 52 whereby the intake assembly 50 controls flow during a rebound and compression stroke.

Figure 5:
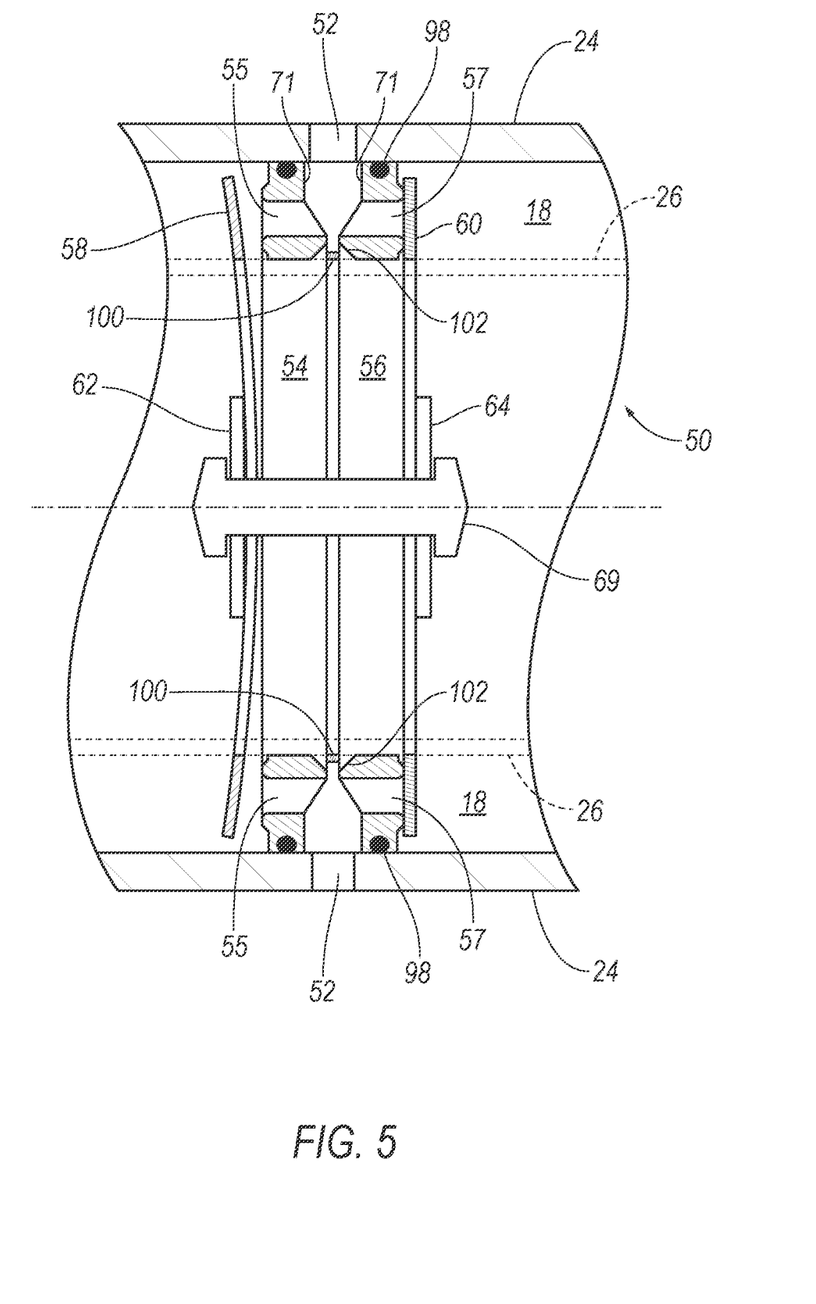
FIG. 5 is a partial sectional view of an intake assembly.

With reference to FIG. 5, the intake assembly 50 may include a rebound ring 54 and a compression ring 56. The rebound ring 54 includes at least one rebound orifice 55, and preferably two rebound orifices. The rebound orifice 55 is obstructed by a bendable rebound disc 58 and the compression orifice 57 is obstructed by a bendable compression disc 60. As shown in FIG. 5 a rebound fulcrum spacer 62 and a compression fulcrum spacer 64 may also be provided. As shown in FIG. 5 the assembly may be held together by a fastener 69. The bendable rebound disc 58 and bendable compression disc 60 are biased to close off the rebound orifice 55 and the compression orifice 57 respectively. As shown in FIG. 2 during a rebound stoke fluid flows from the rebound working chamber 38, out the distal inner tube orifice 94, through fluid chamber 18 to the active rebound valve 42, through the intake assembly 50 and into the compression working chamber 40. And, as shown in FIG. 3 during a compression stroke fluid flows from the compression working chamber 40, out the proximate inner tube orifice 96, through the fluid chamber 18 to the active compression valve 44, through the intake assembly 50 and into the rebound working chamber 38.

Figure 4:
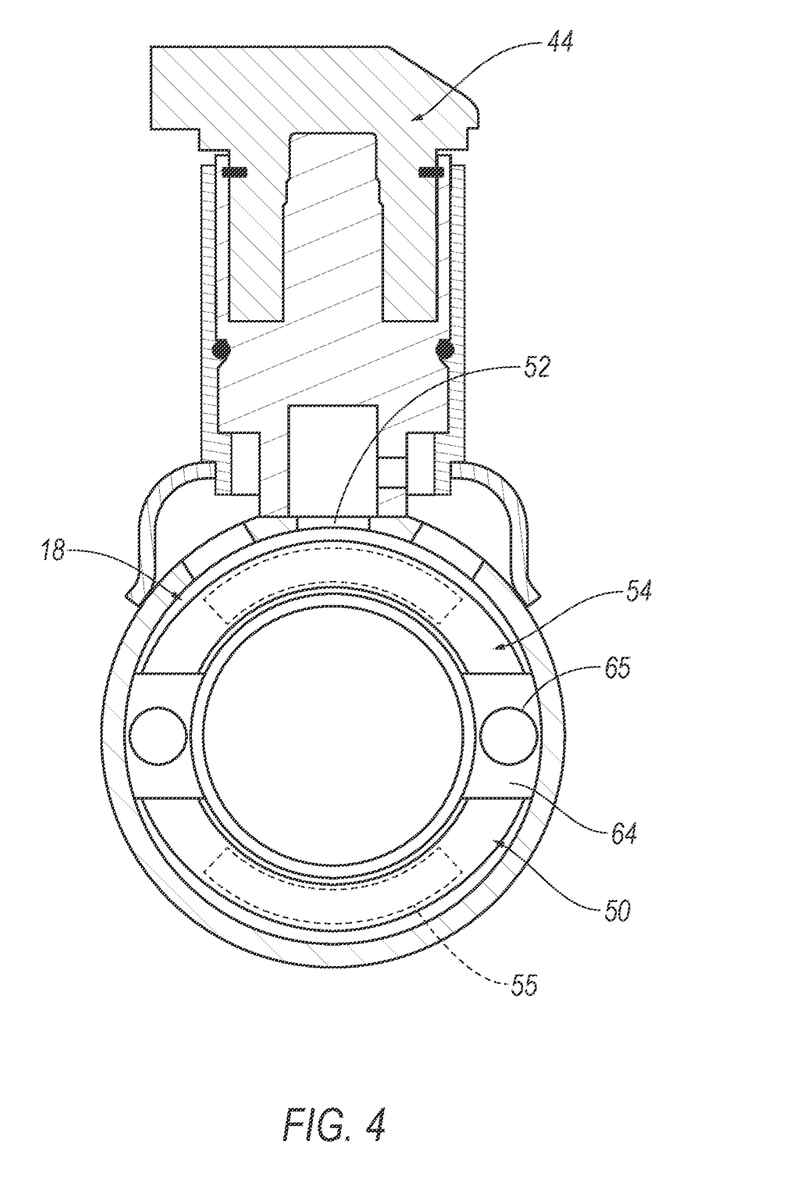
FIG. 4 is a cross-sectional end view of the damper assembly along section line 4-4 illustrating an intake assembly in a reserve chamber.
Figure 7:
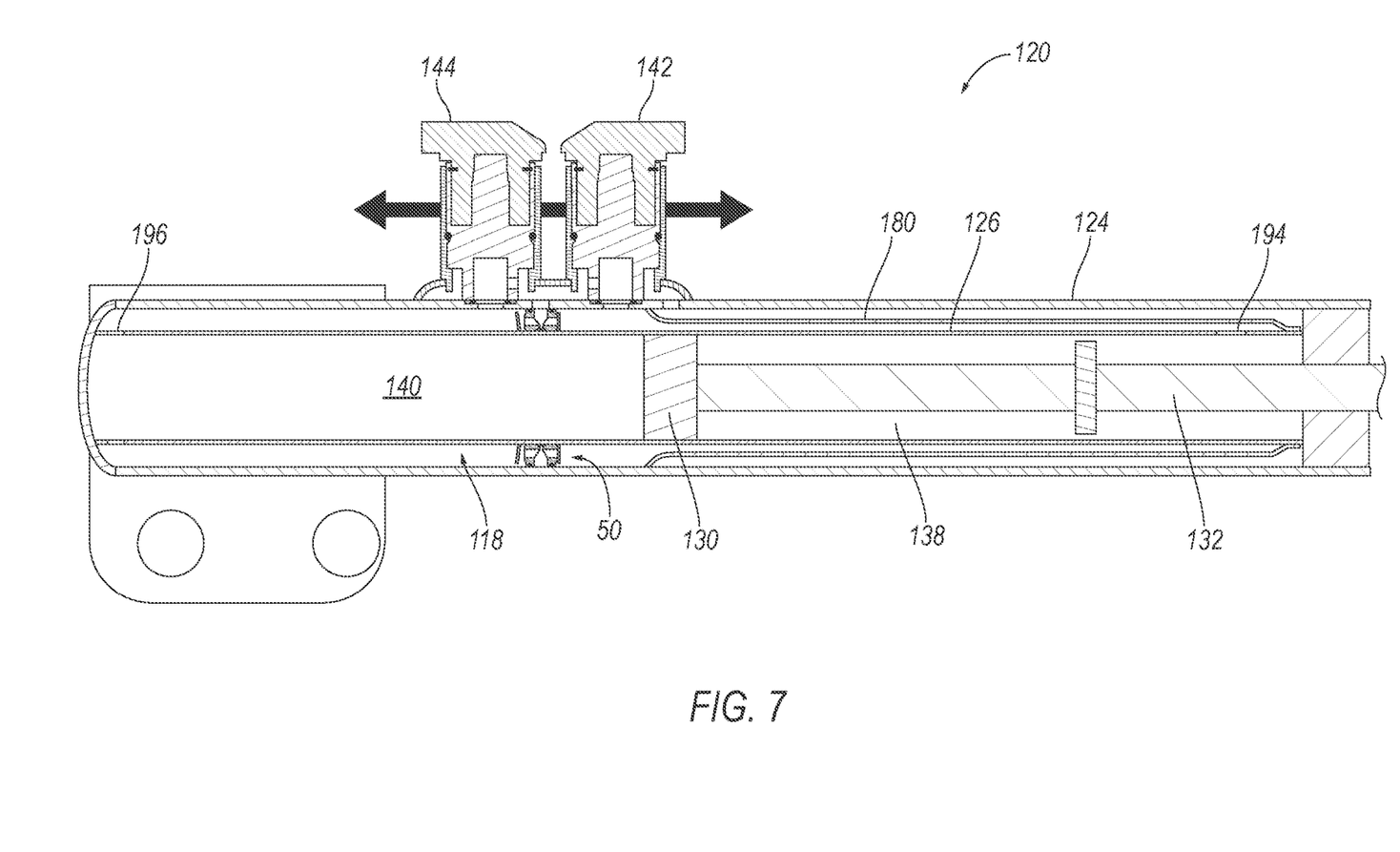
FIG. 7 is a cross sectional view of an intake assembly in the environment of a conventional double tube damper.

Advantageously, and as shown in FIG. 4 (which is taken along section line 4-4 of FIG. 2) the intake assembly 50 is in the shape of a ring and is positioned in the fluid chamber 18 which allows the piston 30 to extend past the active rebound valve 42 and active compression valve 44 thereby reducing the dead length of the damper 20 compared to conventional dampers such as those shown in U.S. Publication No. 2020/0208705 A1. The intake assembly 50 of the current disclosure can be used in a damper having an accumulator such as those shown in FIGS. 2 and 3 or in a more conventional double tube damper as shown in FIG. 7.

The damper 20 shown in FIGS. 2 and 3 includes an accumulator 80. The accumulator 80 is in fluid communication with the active rebound valve 42 and active compression valve 44 through an accumulator orifice 82. The accumulator includes a low pressure chamber 84 that is separated from the compression working chamber 40 by and end wall 86. The accumulator 80 further includes a flexible membrane 88 and a gas chamber 90. The accumulator 80 can receive or discharge fluid as is known in the art.

The active rebound valve 42 is in fluid communication with the fluid chamber 18 through an active rebound valve orifice 92 in the outer tube 24, and with the rebound working chamber 38 through a distal orifice 94 in the inner tube 26. The distal orifice 94 fluidly communicates with the rebound working chamber 38. During a rebound stroke fluid flows from the rebound working chamber 38, out the distal inner tube orifice 94 through the fluid chamber 18, through the active rebound valve orifice 92 in the outer tube 24 into the active rebound valve 42 and through the intake assembly 50 into the compression working chamber 40 through a proximate inner tube orifice 96 into the compression working chamber 40. The active compression valve 44 is in fluid communication with the fluid chamber 18 through an outer tube active compression valve orifice 93 and the proximate inner tube orifice 96. During a compression stroke fluid flows from the compression working chamber 40, out the proximate inner tube orifice 96, through the active compression valve orifice 93 in the outer tube 24, into the active compression valve 44, through the intake assembly 50, through the fluid chamber 18 and into the rebound working chamber 38 through the distal inner tube orifice 94.

With reference to FIGS. 4-6D the intake assembly 50 is shown in greater detail. As described the intake assembly 50 includes the rebound ring 54 and the compression ring 56. The rebound ring 54 and compression ring 56 may have identical construction. The rebound ring 54 and compression ring 56 may each include a pair of orifices 55 and 57 respectively, each of which may be arcuate in shape as illustrated in FIG. 6A. The orifices on the rebound ring 54 are termed rebound orifices, while the orifices on the compression ring 56 are termed compression orifices. The rebound ring 54 and compression ring 56 may each include one or more fastening holes 61. As shown in FIGS. 4 and 5 when the intake assembly 50 is assembled by aligning the fastening holes 61 and securing with a fastener 69. As shown in FIG. 5 the rebound ring 54 and the compression ring 56 face each other in a mirrored configuration.

The intake assembly 50 includes the rebound disc 58 and the compression disc 60 as well as a plurality of fulcrum spacers, 62, 64. The rebound disc 58 and compression disc 60 also each include fastening holes 61. The rebound fulcrum spacers 62 and compression fulcrum spacers 64 are preferably identical. The fulcrum spacers also include fastening holes 61. As shown the rebound ring 54, compression ring 56, the rebound disc 58, the compression disc 60, and the rebound fulcrum spacer 62 and compression fulcrum spacer 64 are all fastened together with a fastener 69 that connects the aforementioned parts through their aligned fastening holes 61. A rivet, bolt, screw or other appropriate fastener may be used. The intake assembly 50 may be assembled prior to the intake assembly 50 being assembled into the damper 20.

Figure 6A:
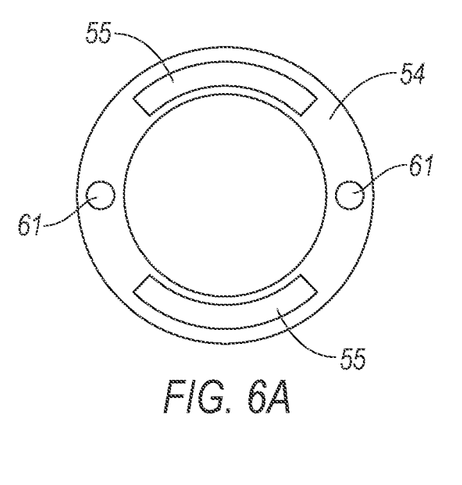
FIG. 6A is an end view of an intake ring.
Figure 6B:
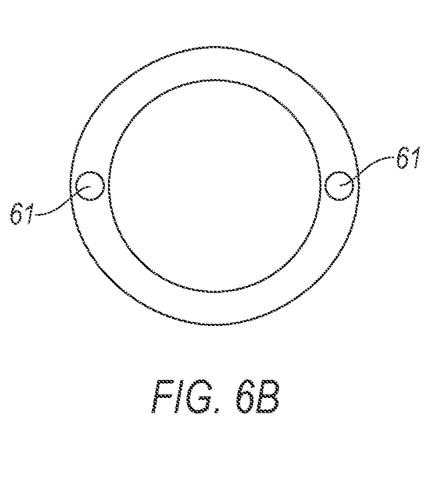
FIG. 6B is an end view of a bendable intake disc.
Figure 6C:
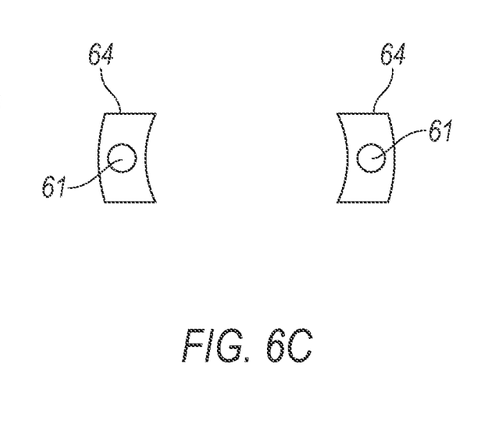
FIG. 6C is an end view of a pair of fulcrum spacers.
Figure 6D:
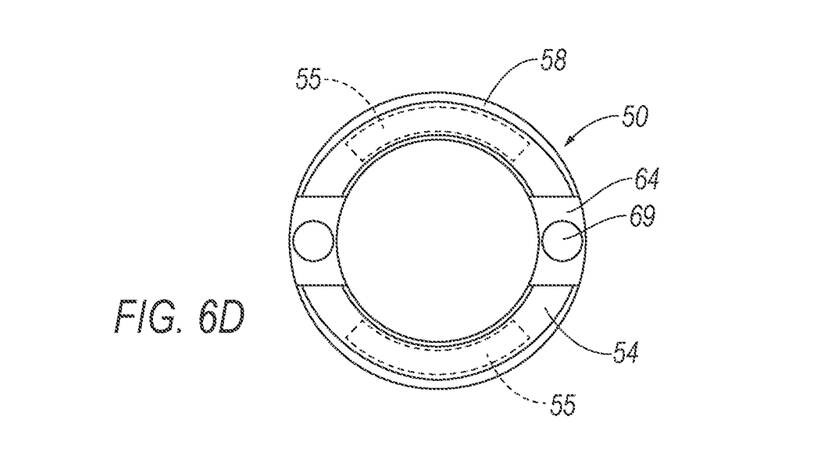
FIG. 6D is an end view of an assembly including an intake ring, intake disc and fulcrum spacer.

As best seen in FIGS. 5 and 6D, the rebound ring 54 and compression ring 56 include respective tapered sections 71 proximate the rebound orifice 55 and the compression orifice 57. The tapered sections provide fluid access to the intake assembly 50 through the outer tube intake orifice 52. As shown in FIG. 5 a ring is 100 may be fixed to inner tube 26. Ring 100 may be a weld or a clip. The rebound ring 54 and the compression ring 56 are fixed to the ring 100 in assembly in a suitable fashion, for example welding. As shown, a pair of O-Rings 98 are provided to seal the rebound ring 54 and the compression ring 56 to the outer tube 24.

With reference to FIGS. 4 and 6D it can be seen that the rebound ring 54 and compression ring have an outer diameter that substantially corresponds to the inner diameter of the outer tube 24 and an inner diameter that substantially corresponds to the outer diameter of inner tube 26. To allow clearance for the rebound disc 58 and compression disc 60 to move away from the rebound orifice 55 and the compression 57 the outer diameter of the rebound disc 58 and compression disc are less than the inner diameter of the outer tube. Likewise, the inner diameter of the rebound disc 58 and compression disc 60 is greater than the outer diameter of the inner tube 26.

The fulcrum spacer 64 may be made of metal or any other suitable material. When assembled, the fastener 69 and fulcrum spacer 64 provides a pre-load to permit a suitable hydraulic seal such that fluid does not flow through the compression ring 56 during a rebound stroke and similarly does not flow through the rebound ring 54 during a compression stroke.

With reference to FIG. 2 a rebound stroke will be described in greater detail. During the rebound stroke the piston moves in the direction of arrow A. As shown fluid is forced out the distal inner tube orifice into the fluid chamber 18. Fluid flows through fluid chamber 18 and travels into the active rebound valve 42. As shown the fluid is held against the intake assembly 50 by a hydraulic seal of the compression bendable disc against the compression ring 56. The active rebound valve 42 is controlled by the ECU 25 to provide the desired damping effect. The fluid flows from the active rebound valve 42 and through the outer tube intake orifice 52. As the compression working chamber 40 enlarges the pressure therein is less than the pressure at the inlet 52 and the low-pressure chamber 84. This pressure difference acts on the bendable disc 58 to move the bendable rebound disc 58 away from or both of the rebound orifices 55 on the rebound ring 54. The rebound fulcrum spacer 62 may be sized and selected to require a greater or lesser fluid pressure to bend the rebound disc 58 away from the rebound orifice. As shown fluid, as necessary may travel from the low-pressure chamber 84 of the accumulator 80 through the outer tube intake orifice 52. Fluid will then flow through the proximate inner tube orifice and into the compression working chamber 40 until the rebound stroke is complete.

With reference to FIG. 3 a compression stroke will be described in greater detail. During the compression stroke the piston move in the direction of arrow B. As shown fluid is forced from the proximate inner tube orifice and into the active compression valve 44, through fluid chamber 18 and outer tube active compression valve orifice 93. The bendable rebound disc 58 is held closed against the rebound orifice 55 by hydrostatic pressure. The fluid flows through the active compression valve 44 as controlled by the ECU 25. As the rebound working chamber enlarges, the pressure therein is less than the pressure at the inlet and the pressure in the compression working chamber 40 is more than the pressure in the low-pressure chamber 84. Here, fluid enters the intake assembly 50 from the outer tube intake orifice 52 and forces the bendable compression disc 60 away from the compression orifices 57. As shown fluid may flow into the low-pressure chamber 84 of the accumulator 80 as needed. Fluid flows into the fluid chamber 18, through the distal inner tube orifice 94 and into the rebound working chamber 38 until the compression stroke is complete.

With reference to FIG. 7 there is shown a traditional two tube damper 120, which does not include the accumulator of FIGS. 2 and 3. The traditional two tube damper includes an active rebound valve 142 and an active compression valve 144 as well as an outer tube 124 and an inner tube 126. A rod 132 including a piston 130 is contained within the inner tube 126. The piston 130 and the inner tube 126 define a rebound working chamber 138 and compression working chamber 140. As above, the rebound working chamber 138 and the compression working chamber 140 contain a fluid, preferably a hydraulic oil. A traditional two tube damper includes a reserve tube 180. In the traditional two tube damper 120 the intake assembly 50 is positioned in fluid chamber 118. The inner tube 126 includes a distal orifice 194 in fluid communication with the rebound working chamber 138 and a proximal orifice 196 in fluid communication with the compression working chamber 140. The operation of the damper 120 is similar the damper 20 shown in FIGS. 2 and 3. Like the damper 20, by including intake assembly 50 in fluid chamber 118 advantageously decreases the dead length of damper 120.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
   an outer tube;
   an inner tube disposed in the outer tube defining a fluid chamber between the outer tube and the inner tube, the inner tube defining an inner volume, the outer tube and inner tube having a common longitudinal axis;
   a piston slidably disposed in the inner tube along the common longitudinal axis, the piston dividing the inner volume of the inner tube into a rebound working chamber and a compression working chamber; and
   a rebound valve fluidly positioned external to the outer tube and fluidly connected to the rebound working chamber and the fluid chamber, the rebound valve having a variable flow resistance;
   a compression valve positioned external to the outer tube and fluidly connected to the fluid chamber and the compression working chamber, the compression valve having a variable flow resistance, the rebound valve and compression valve being separated by a gap along the common longitudinal axis;
   an intake assembly fastened within the fluid chamber at the gap between the rebound valve and the compression valve, the intake assembly in fluid communication with the rebound valve and the compression valve through an outer tube intake orifice and the intake assembly in fluid communication with the inner volume through an inner tube intake orifice, the intake assembly controlling flow between the rebound working chamber and the compression working chamber;
   wherein the intake assembly includes a rebound ring having at least one rebound orifice selectively obstructed during flow between the rebound working chamber and the compression working chamber by a bendable rebound disc;
   wherein the intake assembly includes a compression ring having at least one compression orifice selectively obstructed during flow between the rebound working chamber and the compression working chamber by a bendable compression disc; and
   wherein the rebound ring and bendable rebound disc, and the compression ring and bendable compression disc all include axially aligned fastening holes, and are fastened together in a mirrored fashion through the aligned fastening holes wherein the rebound ring and compression ring face one another.

2. The damper assembly of claim 1 further including at least one fulcrum spacer, the fulcrum spacer providing increased flow resistance to at least one of the bendable rebound disc and compression disc by increasing a bending force.

3. The damper assembly as in claim 1 wherein the rebound ring and the compression ring are fastened to the outer tube by one of a weld and an O-ring.

4. The damper assembly of claim 1 wherein the rebound ring includes a rebound tapered section proximate the rebound orifice and the compression ring including a compression tapered section proximate the compression orifice, the rebound tapered section facing the compression tapered section.

5. The damper assembly of claim 4 wherein at least one of the tapered sections are proximate the outer tube intake orifice.

6. The damper assembly of claim 4 wherein the rebound ring includes a rebound groove and the compression ring includes a compression groove, the rebound groove facing the compression groove and an O-ring sealingly positioned in the rebound and compression grooves.

7. A damper assembly, comprising:
   an outer tube;
   an inner tube disposed in the outer tube defining a fluid chamber between the outer tube and the inner tube, the inner tube defining an inner volume, the outer tube and inner tube having a common longitudinal axis;
   a piston slidably disposed in the inner tube along the common longitudinal axis, the piston dividing the inner volume of the inner tube into a rebound working chamber and a compression working chamber; and
   a rebound valve fluidly positioned external to the outer tube and connected to the rebound working chamber and the fluid chamber, the rebound valve having a variable flow resistance;
   a compression valve fluidly positioned external to the outer tube and connected to the compression working chamber and the fluid chamber, the compression valve having a variable flow resistance;
   an intake assembly fastened within the fluid chamber to control flow between the rebound working chamber and the compression working chamber, the intake assembly including a rebound ring having a rebound orifice and a compression ring having a compression orifice, the rebound ring facing the compression ring, the rebound orifice obstructed by a bendable rebound disc and the compression orifice obstructed by a bendable compression disc; and
   a rebound fulcrum spacer and a compression fulcrum spacer that increase a flow resistance.

8. The damper assembly as in claim 7 wherein the rebound ring and compression ring, the rebound disc and compression disc are fastened together by a first and second fastener.

9. The damper assembly as in claim 8 wherein the first and second fastener are selected from the group consisting of rivets, bolts, and screws.

10. The damper assembly as in claim 7 wherein the intake assembly is positioned at a gap between the rebound valve and compression valve.

11. The damper assembly as in claim 7 wherein the rebound orifice and the compression orifice are arcuate in shape.

12. The damper assembly as in claim 11 wherein the rebound ring and the compression ring are identical in shape.

13. The damper assembly as in claim 12 further comprising at least one seal between the rebound orifice and the inner tube.

14. The damper assembly as in claim 13 further comprising a rebound fulcrum spacer and a compression fulcrum spacer, the rebound fulcrum spacer and compression fulcrum spacer acting to preload the rebound disc and the compression disc into a closed position over the rebound orifice and the compression orifice.

15. The damper assembly as in claim 7 wherein the rebound disc includes a tapered section proximate the rebound orifice, and the compression disc includes a tapered section proximate the compression orifice.

16. The damper assembly as in claim 15 wherein the rebound orifice faces the compression orifice.

* * * * *